United States Patent
Bartolome Rodrigo et al.

(10) Patent No.: US 11,876,703 B2
(45) Date of Patent: Jan. 16, 2024

(54) ROUTING COMMUNICATION IN TELECOMMUNICATIONS NETWORK HAVING MULTIPLE SERVICE COMMUNICATION PROXIES

(71) Applicant: Telefonaktiebolaget LM Ericsson (publ), Stockholm (SE)

(72) Inventors: Maria Cruz Bartolome Rodrigo, Torremocha de Jarama Madrid (ES); Volker Kleinfeld, Aachen (DE); Mary Amarisa Robison, Aachen (DE); Magnus Hallenstål, Täby (SE); Peng Li, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/798,495

(22) PCT Filed: Feb. 10, 2021

(86) PCT No.: PCT/EP2021/053219
§ 371 (c)(1),
(2) Date: Aug. 9, 2022

(87) PCT Pub. No.: WO2021/160676
PCT Pub. Date: Aug. 19, 2021

(65) Prior Publication Data
US 2022/0393971 A1    Dec. 8, 2022

(30) Foreign Application Priority Data
Feb. 10, 2020 (WO) ................ PCT/CN2020/074619

(51) Int. Cl.
*H04L 45/302* (2022.01)
*H04L 45/00* (2022.01)
*H04L 45/745* (2022.01)

(52) U.S. Cl.
CPC ............ *H04L 45/304* (2013.01); *H04L 45/20* (2013.01); *H04L 45/745* (2013.01)

(58) Field of Classification Search
CPC ..... H04L 45/304; H04L 45/20; H04L 45/745; H04L 45/02; H04L 67/51
See application file for complete search history.

(56) References Cited

U.S. PATENT DOCUMENTS

2016/0315787 A1*  10/2016  Miyao ................... H04L 45/745
2021/0297942 A1*   9/2021  S Bykampadi ....... H04W 48/16
2021/0377097 A1*  12/2021  Wang ................... H04L 67/1014

OTHER PUBLICATIONS

International Search Report and Written Opinion of the International Searching Authority for PCT International Application No. PCT/EP2021/053219 dated May 19, 2021.

(Continued)

*Primary Examiner* — Yaotang Wang
(74) *Attorney, Agent, or Firm* — Sage Patent Group

(57) ABSTRACT

A method performed by a function in a network node in a telecommunications network having at least one service communication proxy, SCP, deployed between a first network node and a second network node. The method includes receiving a request for routing information to signal a message from the first network node to the second network node. The method further includes responsive to the request from the first network node, providing a response to a network node that sent the request wherein the response identifies at least a portion of a routing path for the message based on a routing path configuration.

21 Claims, 12 Drawing Sheets

(56) References Cited

OTHER PUBLICATIONS

3GPP TS 23.502 V16.1.1, "3rd Generation Partnership Project; Technical Specification Group Services and System Aspects; Procedures for the 5G System; Stage 2 (Release 16)," Jun. 2019, 495 pages.

Deutsche Telekom AG et al., "Introduction of indirect communication between NF services, and implicit discovery," SP-190215, TSG SA Meeting #83, Mar. 20-22, 2019, Shenzhen, China, 18 pages.

China Mobile, "eSBA communication schemas related to general discovery and selection," S2-1902047, 3GPP TSG-SA WG2 Meeting #131, Feb. 25-Mar. 1, 2019, Santa Cruz—Tenerife, Spain, 5 pages.

Deutsche Telekom AG et al., "SCP: Service-mesh-based deployment options," S2-1906790, 3GPP TSG-SA WG2 Meeting #133, Reno, NV, USA, May 13-17, 7 pages.

3GPP TS 23.501 V16.1.0, "3rd Generation Partnership Project; Technical Specification Group Services and System Aspects; System Architecture for the 5G System; Stage 2 (Release 16)," Jun. 2019, 368 pages.

3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.

3GPP TS 23.502 V16.2.0, "3rd Generation Partnership Project; Technical Specification Group Services and System Aspects; Procedures for the 5G System (5GS); Stage 2 (Release 16)," Sep. 2019, 525 pages.

3GPP TS 29.501 V16.2.0, "3rd Generation Partnership Project; Technical Specification Group Core Network and Terminals; 5G System; Principles and Guidelines for Services Definition; Stage 3 (Release 16)," Dec. 2019, 71 pages.

Office Action dated Aug. 21, 2023 for Japanese Patent Application No. 2022-546117, 4 pages.

Oracle; "Discussion of SCP Deployment Scenarios"; S2-1901765, SA WG2 Meeting #131; Feb. 25-Mar. 1, 2019; Tenerife, Spain; 3 pages.

3GPP TS 23.502 v16.3.0; 3rd Generation Partnership Project; Technical Specification Group Services and System Aspects; Procedures for the 5G System (5GS); Stage 2, (Release 16); Dec. 22, 2019; 558 pages.

* cited by examiner

ROUTING COMMUNICATION IN TELECOMMUNICATIONS NETWORK HAVING MULTIPLE SERVICE COMMUNICATION PROXIES

RELATED APPLICATIONS

This application is a 35 U.S.C. § 371 national stage application of PCT International Application No. PCT/EP2021/053219 filed Feb. 10, 2021, which claims the benefit of PCT Application No. PCT/CN2020/074619 filed Feb. 10, 2020, the contents of which are hereby incorporated by reference herein.

TECHNICAL FIELD

The present disclosure relates generally to communications systems and, more particularly, to routing communications in a telecommunication system having multiple service communication proxies (SCPs).

BACKGROUND

In the context of 5th generation core network (5GC), a network element called SCP (Service Communication Proxy) is defined that allows establishing an indirect communication between a consumer and a producer.

It is expected that the client (e.g., normally a consumer, except for notifications where the client is the producer) is configured with the SCP address for indirect communication. Therefore, a client is configured to use direct or indirect communication as described, for example in 3GPP TS 23.501 v16.2.0, System architecture for the 5G system (5GS), stage 2, and 3GPP TS 23.502 v16.2.0, Procedures for the 5GS, stage 2.

SUMMARY

In 3GPP Release 16 for 5G, two communication modes exist. A mode referred to as a direct mode, where a consumer communicates directly to a producer; and a mode referred to as an indirect mode, where a SCP is included as an intermediate element between a producer and a consumer. 3GPP Release 16, however, does not explicitly describe how multiple SCP deployments should be handled, including in the case of multiple SCPs in line or of SCP redundancy.

According to some embodiments of inventive concepts, a method is performed by a function in a network node in a telecommunications network having at least one service communication proxy, SCP, deployed between a first network node and a second network node, The method includes receiving a request for routing information to signal a message from the first network node to the second network node. The method includes responsive to the request from the first network node, providing a response to a network node that sent the request wherein the response identifies at least a portion of a routing path for the message based on a routing path configuration.

In other embodiments, a network node and computer program performing similar operations are provided.

In other embodiments, a method is performed by a service communication proxy, SCP, in a telecommunications network having a plurality of SCPs deployed between a first network node and a second network node. The method includes signalling a request to a function in a network node to discover an identity of each SCP in the plurality of SCPs deployed in a routing path between the first network node and the second network node. The method includes, responsive to the signalling, receiving an identification of the identities of each SCP in the plurality of SCPs deployed in the routing path between the first network node and the second network node. The method includes discovering at least a next hop in the routing path based on the identification.

In other embodiments, a SCP node and computer program performing similar operations are provided.

Potential advantages may include that deployment and routing path configuration are centralized in a function in a network node such as an NRF. The aggregation of NF and SCP per region allows route decisions to be taken on region level, which simplifies configuration and is less error prone, without requiring distributed configuration changes in multiple NFs/SCPs.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
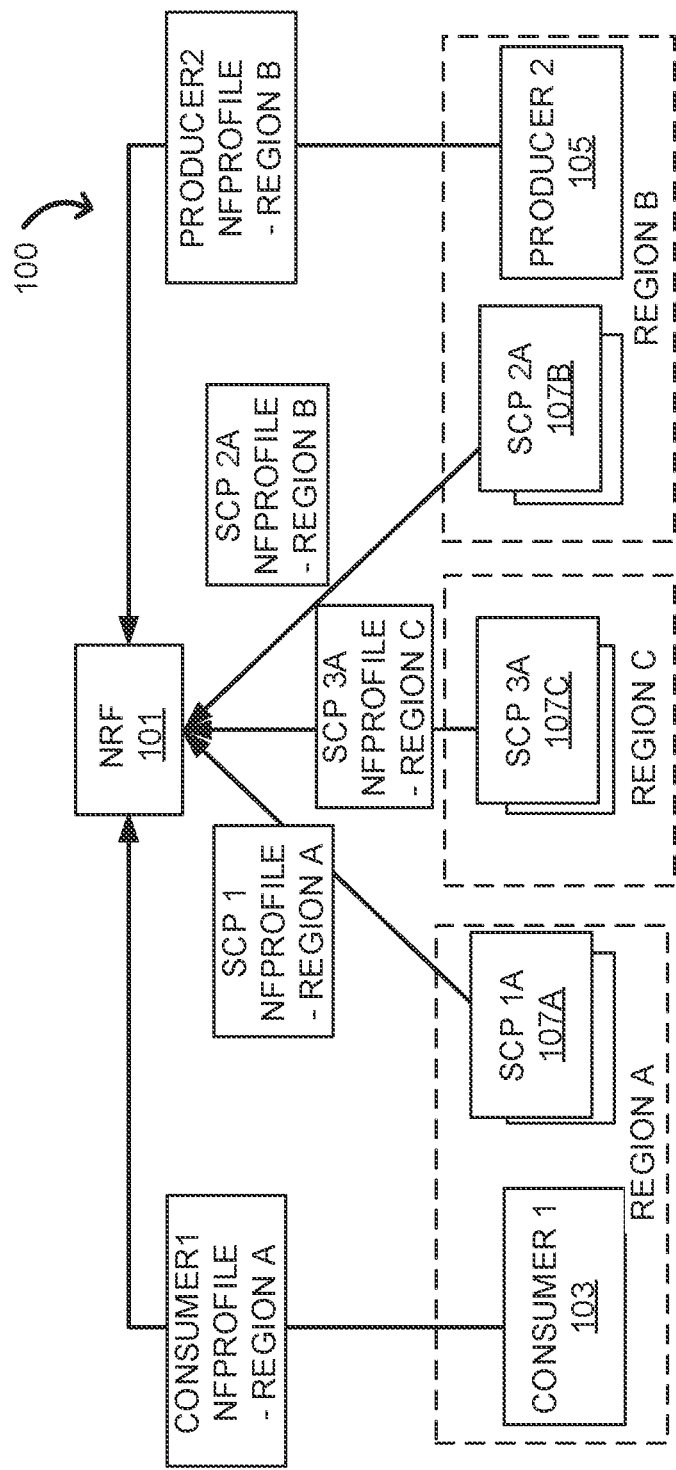
FIG. 1 is a telecommunications network illustrating a deployment having three regions according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In 3GPP Release 16 for 5G, two communication modes exist. A mode referred to as a direct mode, where a consumer communicates directly to a producer; and a mode referred to as an indirect mode, where a SCP is included as an intermediate element between a producer and a consumer. 3GPP Release 16, however, does not explicitly describe how multiple SCP deployments should be handled, including in the case of multiple SCPs in line or of SCP redundancy.

Potential solutions for handling multiple SCP deployments may include the following.

In the case of SCP redundancy where alternative SCPs are configured in a client, a potential solution may be as follows. If a first SCP (e.g., SCP1-a) is not reachable, then a second SCP (e.g., SCP1-b) is chosen. Load balancing can be applied between available SCPs. Such a potential solution is not described in 3GPP Release 16, and may be implementation specific.

In the case of multiple SCPs in a routing path, a potential solution may be as follows. Sometimes, a producer can only be reached by a consumer via multiple SCPs. For example, two SCPs, where one SCP is closer to the consumer and another SCP is closer to the producer and it is not precluded to have more SCPs in the routing path. In some cases, it may make sense to have multiple SCPs in a routing path such as, for example, in a transit network. That is, a network is traversed between the producer network and the consumer network. In another example, there may be an SCP per public land mobile network (PLMN) having different "groups" of network functions (NFs) that may be accessed by an SCP, such as multiple trust domains in the same PLMN, different vendor "platforms" isolated by an SCP, and/or different (entry) PLMN SCP depending on the visited PLMN (V-PLMN).

If there are multiple SCPs in a routing path (e.g. SCP1, SCP2, etc.), 3GPP Release 16 appears to assume that SCP1 is configured to reach SCP2, while SCP2 is configured to reach SCP3, etc. However, nothing is specified in 3GPP Release 16.

The following explanation of potential problems is a present realization as part of the present disclosure and is not to be construed as previously known by others. As described above, a solution for handling multiple SCP deployments is not described in 3GPP Release 16. Rather, 3GPP Release 16 only indicates that each NF configures an address of the SCP, which has potential limitations including, for example:

Each client is configured to use direct versus indirect communication. However, a change requires configuration modification per NF.

That is, only NF granularity appears to be described, and it is not possible to use e.g. direct communication for some services but indirect communication for other services.

A deployment change may require client configuration changes.

Deployment planning may be cumbersome and error prone. Deployment planning is based in configuration in multiple NFs and SCPs. That is, a routing path is per NFs, and is not meant to distinguish per services, operations, subscriber, etc.

Various embodiments described herein may operate to provide solutions to these and other potential problems.

In various embodiments, deployment information may be registered/stored in a network repository function (NRF) (also referred to herein as a network repository node) which may be used by a NF and an SCP to determine a route(s) for a service request. In this way, deployment information is centralized in the NRF, and the client NF/SCP is able to get the next hop in a routing path.

The NF may be any of an AMF (Access and Mobility Management Function), a SMF (Session Management Function), a PCF (Policy Charging Function), a NEF (Network Exposure Function), a NSSF (Network Slice Selection Function), a SMSF (Short Message Service Function), an AUSF (Authentication Server Function), a CHF (Charging Function), a NRF, a NWDAF (Network Data Analytics Function), an I-CSCF (Interrogating-Call Session Control Function), a S-CSCF (Serving-Call Session Control Function), an IMS-AS (IP Multimedia Subsystem-Application Server), a UDM (Unified Data Management), a UDR (User Data Repository), an AF (Application Function), etc.

FIG. 1 depicts an example deployment in a telecommunications network 100 including NRF 101 and three regions (regions A, B, and C). Referring to FIG. 1, region A includes "Consumer 1" 103, "SCP 1a" 107a and SCP 1b (shown beneath 107a), region B includes "Producer 2" 105, "SCP 2a" 107b and SCP 2b (shown beneath 107b). Region C includes "SCP3a" 107c and SCP 3b (shown beneath 107c).

The SCP can be deployed at PLMN level, at shared-slice level, and at slice-specific level. It is left to operator deployment to ensure that SCPs can communicate with relevant NRFs.

In various embodiments of inventive concepts, information stored/registered in the NRF (e.g., NRF 101) includes, without limitation, an SCP profile for each of one or more SCPs. An SCP profile includes, without limitation, SCP information such as, e.g., availability, priority, capacity, locality, etc. An SCP profile may further include a region in which the SCP belongs. This allows determining a list of SCPs per region. Alternatively, in some embodiments, this could be a region profile. Referring to the example deployment in FIG. 1, an SCP profile or region profile includes the following for each region: Region A includes "SCP 1a" 107a and SCP 1b; Region B includes "SCP 2a" 107b and SCP 2a; and Region C includes "SCP 3a" 107c and SCP 3b. The SCP profile or region profile can be initially configured but can be modified or updated dynamically by each SCP in the telecommunications network (e.g., SCP registration in NRF).

In various embodiments of inventive concepts, information stored/registered in the NRF (e.g., NRF 101) further includes, without limitation, a NF profile updated with region information; and a region path configuration. The region path configuration includes, without limitation, an identity of the regions a consumer needs to traverse to reach a producer. For example, referring to FIG. 1, to reach "Producer 2" 105, "Consumer 1" 103 needs to be routed via region C. That is, routed from region A to region C to region B as shown in FIG. 1. Such routing may require some configuration in NRF 101. Alternatively, depending on the routing complexity, in some cases, the region path configuration can be part of the SCP profile (e.g., if there is only one SCP per region).

In various embodiments of inventive concepts, an NF and SCPs register their profiles with region information in the NRF, and each NF and SCP discovers from the NRF the NF and SCP region relation. This allows each consumer/client NF to discover from the NRF information for whether the consumer/client NF has to establish a direct or indirect communication. In the case of indirect communication, the next (region) hop, that may be served by one SCP or a list of SCPs is discovered, and then selection is performed by the consumer/client. Each SCP may perform a discovery for the corresponding next region as well.

That is, once the deployment information (including region) is centralized in the NRF, each NF/SCP is able to discover the next hop address.

The routing logic also can use other information known from application processing (e.g. message parameters in service requests) and combine this information with deployment information to determine a route.

In some embodiments of inventive concepts, alternatively, the region path configuration is not stored in the NRF, but is inferred. An NF consumer and the SCP can use the region information as additional information for selecting a NF producer or an SCP to route to. Depending on the network topology and services to be invoked, the region information obtained from the NRF can be completely sufficient to route service requests. The SCP/NF can select the next hop (region) based, e.g., on location or availability.

Potential advantages of presently disclosed embodiments may include that deployment and routing path configuration are centralized in a NRF. The aggregation of NF and SCP per region allows route decisions to be taken on region level, what simplifies configuration and is less error prone, without requiring distributed configuration changes in multiple NFs/SCPs.

Additional potential advantages of presently disclosed embodiments may include that a region in which an SCP is deployed may be changed dynamically by updating each SCP profile (by configuration or by registering an updated SCP profile). Region routing path can be changed in the NRF as well, e.g. for providing a new service or by configuration. Alternatively, for a simple enough deployment (e.g. if the routing path is defined for each region, without having a granularity of e.g. services), the routing path can be part of the SCP profile, including a field to consider next Region.

Additional potential advantages of presently disclosed embodiments may include that regions are defined, where each region contains multiple SCPs (that may have very different capabilities). Then, routing can be fully dynamic within a region, while the only need for a static configuration may be limited to the region path from a consumer to a producer. When there is no more than one or two regions in between the region (of producer and/or consumer), then the need of static configuration is very limited for, e.g, deployment needs that will not change easily (e.g. definition of a transit SCP for a PLMN).

Additional potential advantages of presently disclosed embodiments may include that each NF/SCP (client) does not need to be configured with the SCP to be used, nor with the indication to use direct or indirect communication, but the client discovers that information. That is, the NF/SCP is able to get dynamically the next hop (i.e. either direct or indirect communication, and for indirect the SCP(s) that may be used). This may simplify deployment and routing path modifications. This also may optimize or improve communication in a region, since the communication from a consumer to a producer in the same region can be identified as direct, based on NRF information, avoiding the need to configure that in the client (each client may need to be configured with a list of the producers in the same region).

Additional potential advantages of presently disclosed embodiments may include that the region routing path is not configured, but in a case of multiple regions available to reach the same producer, the next Region can be selected based on availability or other available information, e.g. location.

Region path configuration may include, without limitation, routing path definitions. Routing paths may be defined with different granularities: e.g. per NF type, per NF instance, per NF service type, per NF service instance, per NF Set, per NF service Set, per NF service operation, per Group (partitions), etc.

Utility may depend on an operator's deployments. For example, different NF Sets may be provided by different vendors in different trust domains. Each trust domain could deploy a different SCP.

Figure 2:
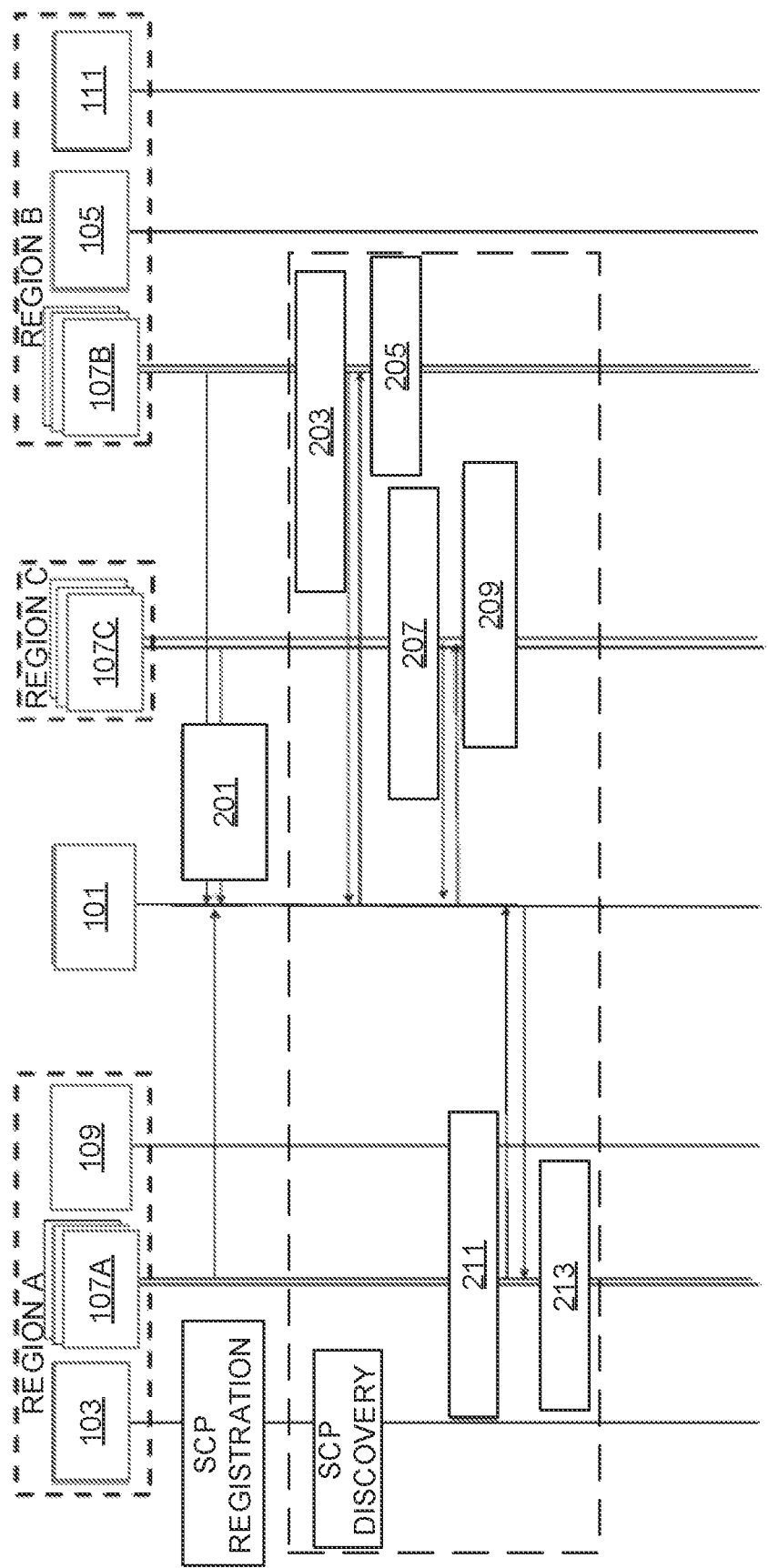
FIG. 2 is a signaling diagram illustrating SCP registration and discovery by SCPs according to some embodiments of inventive concepts.

FIG. 2 depicts an example of SCP registration and discovery by SCPs in the example telecommunications network of FIG. 1. In the SCP registration, all SCPs (e.g., SCP 107a, SCP 107v, and SCP 107c) register its profile in the NRF 101 in block 201.

In SCP discovery, an SCP can identify if there are other SCPs in a routing path by sending a request to the NRF. For example, SCP 107b in block 203 transmits a NRF operation Next hop message to the NRF 101. The SCP 107b receives a list identifying SCPs in a next hop of the SCP 107b from the NRF 101. In FIG. 2, the list for SCP 107b contains SCP 107C and other SCPs in Region C. In block 207, SCP 107c transmits a NRF operation Next hop message to the NRF 101. The SCP 107c receives a list identifying SCPs in a next hop of the SCP 107c from the NRF 101 in block 209, where the list of SCPs contains SCP 107a and other SCPs in region A and SCP 107b and other SCPS in Region B. In block 211, SCP 107a transmits a NRF operation Next hop message to the NRF 101. The SCP 107a receives a list identifying SCPs in a next hop of the SCP 107a from the NRF 101 in block 213, where the list of SCPs contains SCP 107c and other SCPs in region C.

Figure 3:
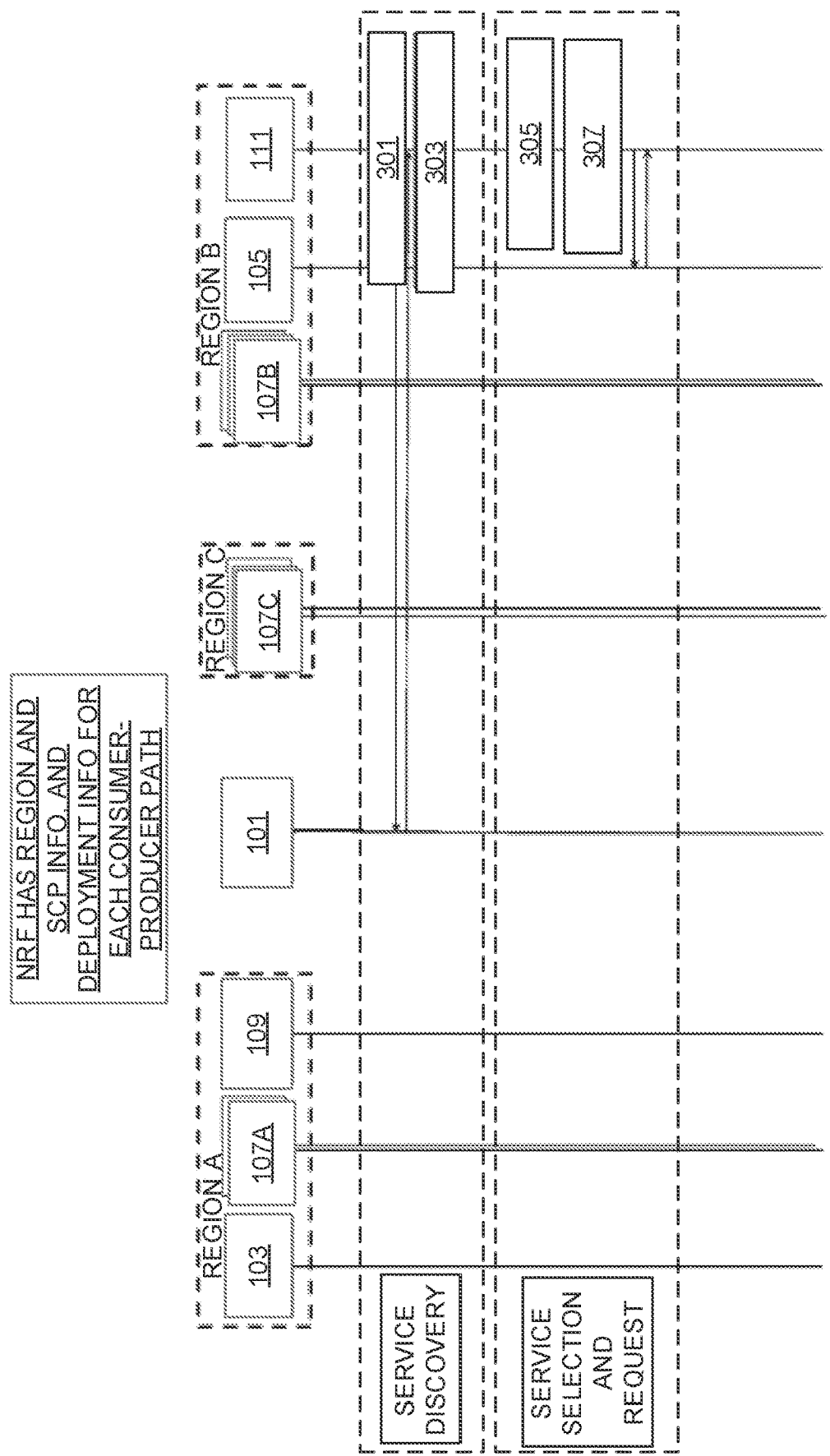
FIG. 3 is a signaling diagram illustrating direct communication within a region according to some other embodiments of inventive concepts.

In some embodiments of inventive concepts, the region path (e.g., routing path) configuration is per NF. The SCPs may discover the next hop independently of the producer that needs to be reached. For example, the region path to reach producer 105 from consumer 103 is not the same as the path to reach producer 109 from consumer 111. In these embodiments, the NRF 101 has Region and SCP information, and deployment information for each consumer-producer path. FIG. 3 depicts direct communication within a region. In block 301, the consumer 111 performs producer 105 service discovery via NRF 101. The NRF 101 provides a direct communication path to the consumer 111 in a service discovery result in block 303. In block 305, the consumer 111 selects producer 105 instances. In block 307, the consumer 111 transmits a producer service request to producer 105 using direct communication.

Figure 4:
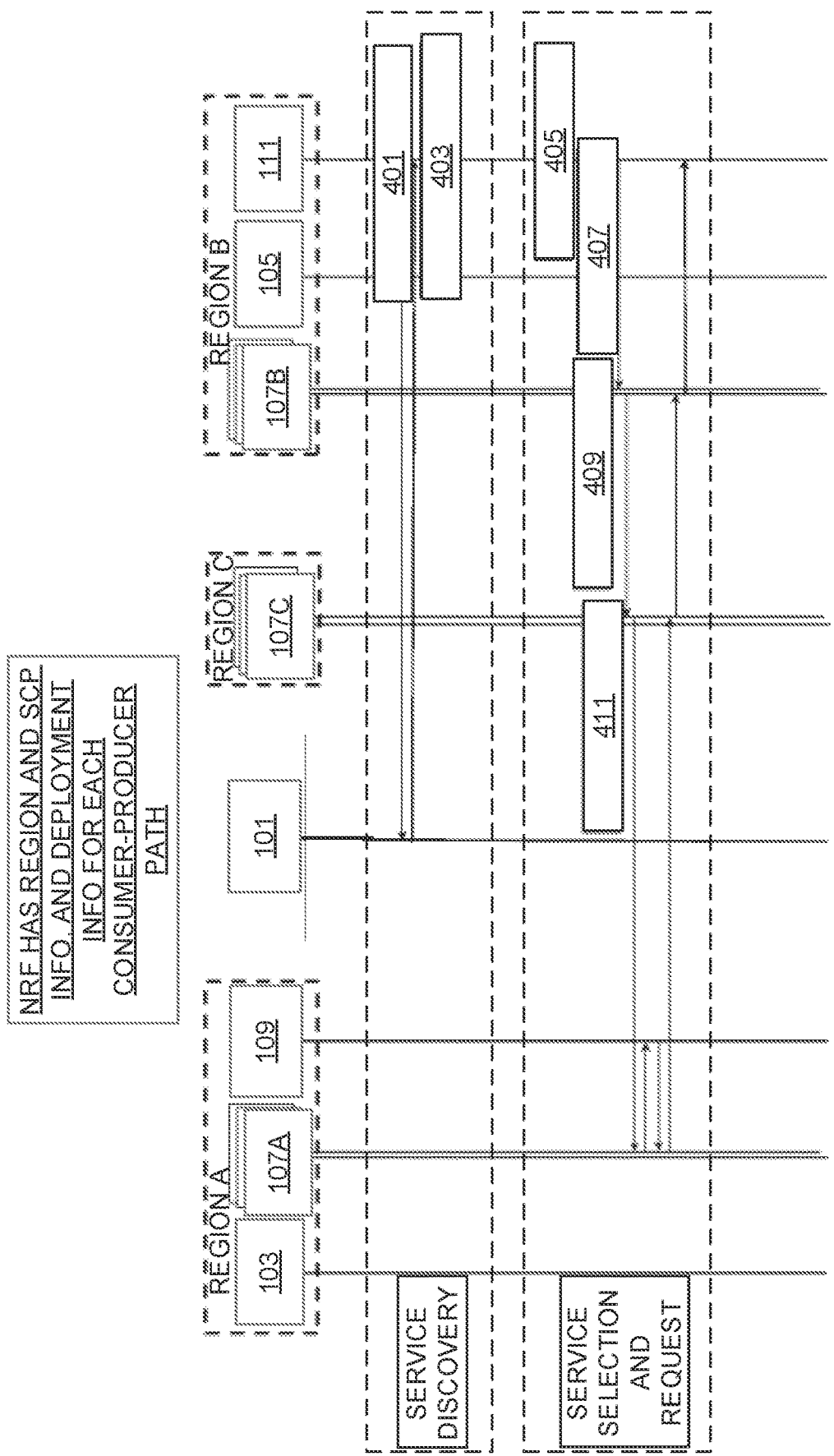
FIG. 4 is signaling diagram illustrating indirect communication with next hop SCP discovery according to some embodiments of inventive concepts.

FIG. 4 depicts indirect communication via next hop SCP discovery. The NRF 101 has Region and SCP information, and deployment information for each consumer-producer path. In FIG. 4, the Region path configuration is per NF, so the SCPs have already discovered next hop independently of the producer that needs to be reached, as described in FIG. 2 above. Thus, the SCPs do not have to perform service discovery to determine next hop paths. In block 401, the consumer 111 performs producer 109 service discovery via NRF 101. The consumer 111 in block 403 receives a service discover request that lists next hop: SCP 107b instances. The consumer 111 selects an SCP 107b instance in block 705 and sends a producer 109 service request via the selected SCP 107b instance. In block 409, the SCP 107b instance transmits the producer 109 service request to the next hop in region C after selecting an SCP 107c. In block 411, the next hop for the SCP 107c selected is an SCP in Region A. The SCP 107c that was selected chooses an SCP 107a and transmits the producer 109 service request to the selected SCP 107a in block 413. The selected SCP 107a sends the producer 109 service request to producer 109, receives a response to the producer 109 service request, and sends the response back to an SCP 107c in Region C. The SCP 107c in Region C sends the response back to an SCP 107b in Region B. The SCP 107b in Region B sends the response to consumer 111.

Figure 5:
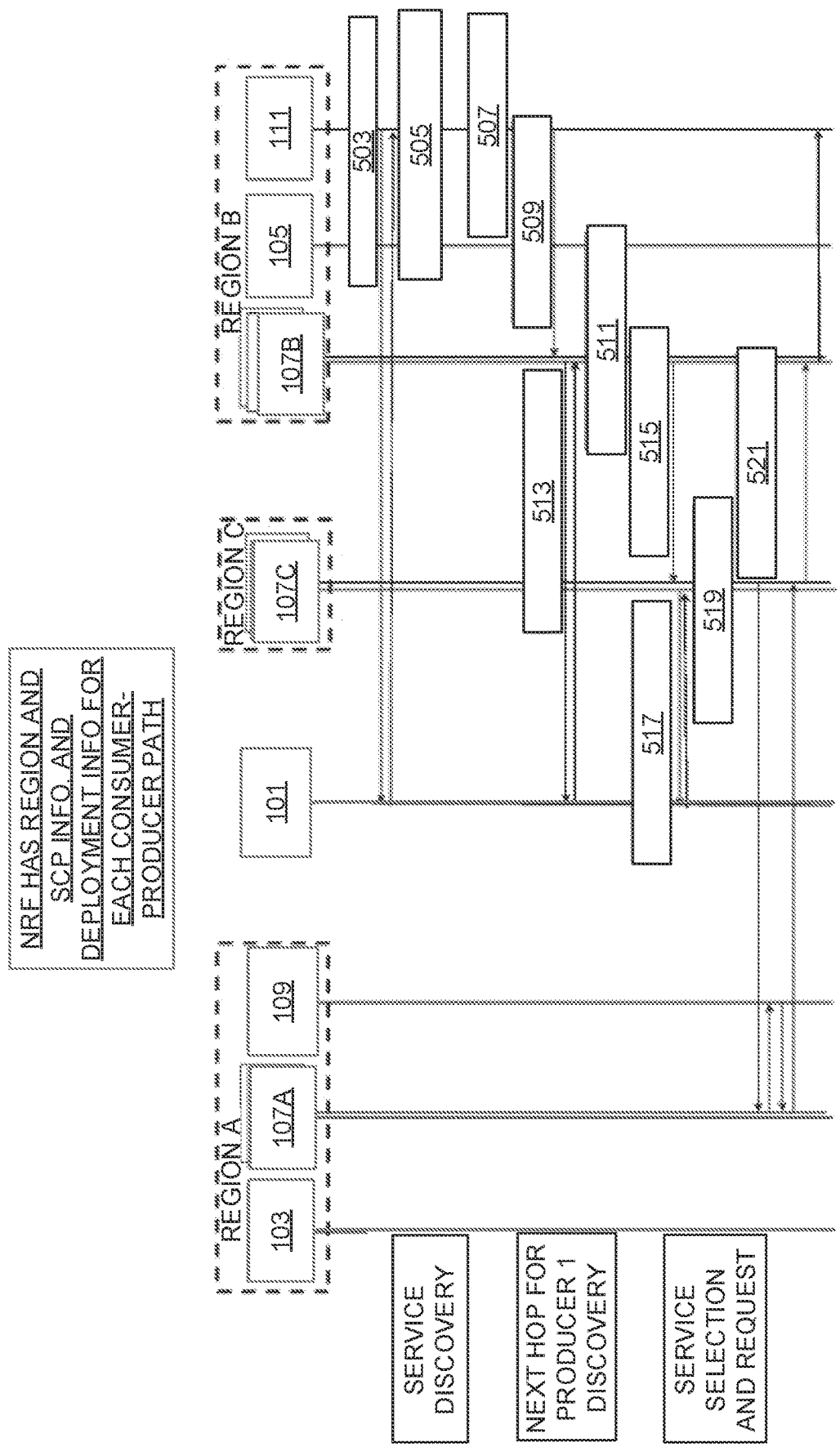
FIG. 5 is a signaling diagram illustrating indirect communication with next hop SCP discovery per service according to some embodiments of inventive concepts.

If Region path is defined per service granularity, then even though discovery per NF granularity may be done (see FIG. 2), a discovery for a specific producer is required to be performed, which is depicted in FIG. 5. The NRF 101 has Region and SCP information, and deployment information for each consumer-producer path. In block 501, consumer 111 performs producer 109 service discovery by sending a service discovery request to the NRF 101. The NRF 101 transmits a service discovery response to the consumer 111 in block 503 where the service discovery response lists a next hop indicating an instance of SCP 107b is the next hop to reach producer 109. The consumer 111 selects an SCP 107b instance in block 505 where the selection may be based on e.g., locality. The consumer 111 transmits a producer 109 service request via the selected SCP 107b instance in block 507.

The selected SCP 107b instance identifies if there are other SCPs in the region path in block 509. This may be done by sending a next hop discovery request to the NRF 101. In block 511, the selected SCP 107b instance receives a discovery response from NRF 101. The discovery response indicates the next hop to reach producer 109 is Region C. The discovery response has a list of SCPs, which lists SCP 107c instances. In block 513, the selected SCP 107b instance selects an SCP 107c instance and transmits the producer 109 service request to the selected SCP 107c instance.

In block 515, the selected SCP 107c instance identifies if there are other SCPs in the region path to producer 109. This may be done by sending a next hop discovery request to the NRF 101. In block 517, the selected SCP 107c instance receives a discovery response from NRF 101. The discovery response indicates the next hop to reach producer 109 is Region A. The discovery response has a list of SCPs, which lists SCP 107a instances. In block 519, the selected SCP 107c instance selects an SCP 107a instance and transmits the producer 109 service request to the selected SCP 107a instance.

The selected SCP 107a instance sends the producer 109 service request to producer 109, receives a response to the producer 109 service request, and sends the response back to an SCP 107c instance in Region C. The SCP 107c instance in Region C sends the response back to an SCP 107b instance in Region B. The SCP 107b instance in Region B sends the response to consumer 111.

Figure 6:
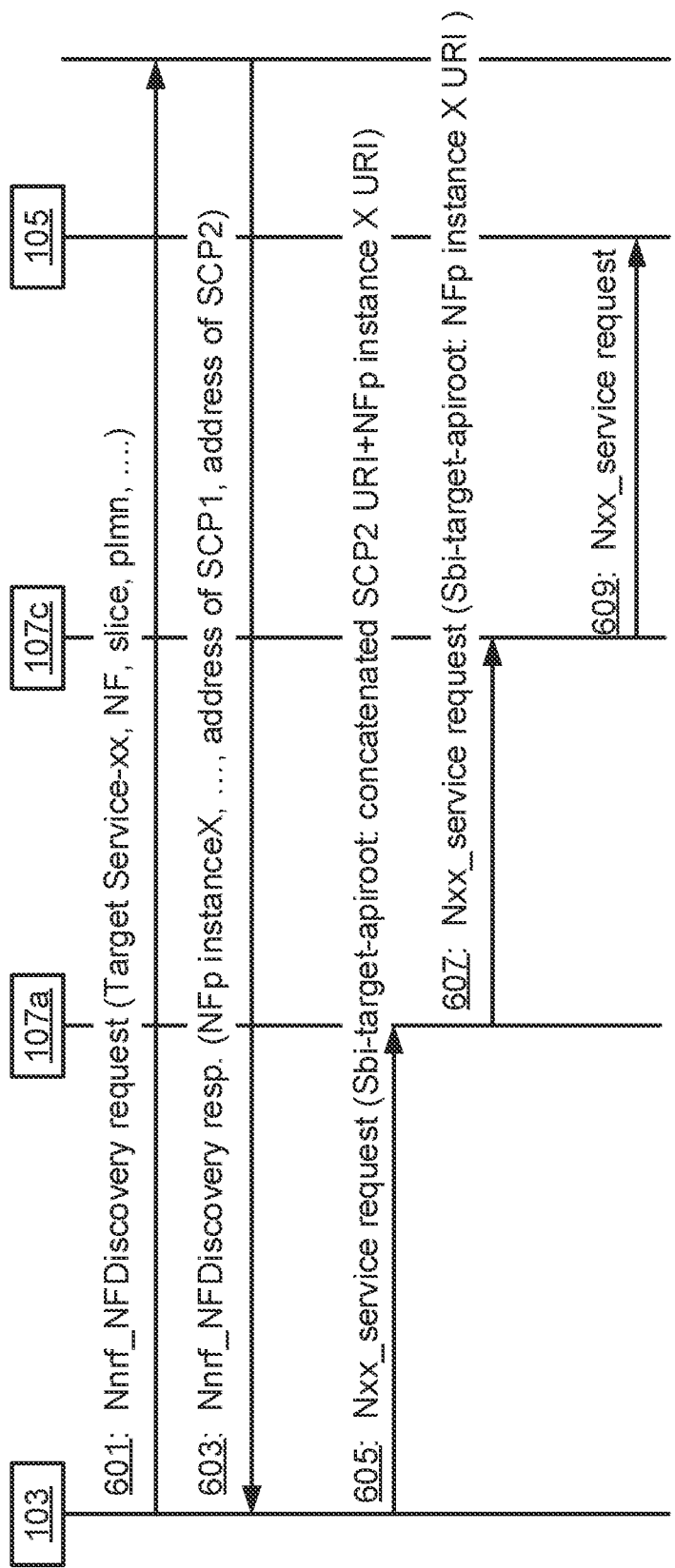
FIG. 6 is a signaling diagram illustrating indirect communication with routing path SCP discovery according to some embodiments of inventive concepts.

In FIGS. 4-5, a discovery request is sent to the NRF 101 to find the routing path between a consumer and a producer when there are multiple SCPs to determine the next hop. In some embodiments, the complete routing path is returned in the discovery response Turning to FIG. 6, non-delegated discovery is depicted to receive a whole routing path. In block 601, the consumer 103 transmits a producer 105 service discovery request to the NRF 101. The discovery request may in include a target service (e.g., producer 105), an NF identifier, a slice identifier, a plmn identifier, etc. The response to the discovery request is transmitted to the consumer 103 in block 603. The response includes the address of each SCP in the path from consumer 103 to producer 105 (i.e., SCP 107a, SCP 107c, and SCP 107b (not shown)). The consumer 103 transmits a producer 105 service request to SCP 107a in block 605. The producer 105 service request may include concatenated SCP addresses of SCPs in the path from SCP 107a to producer 105 (e.g., SCP 107c and SCP 107b)

The SCP 107a receives the producer 105 service request and sends the producer 105 service request to the next SCP in the path (e.g, SCP 107c) to producer 105 in block 607. The next SCP in the path (SCP 107c) then sends the producer 105 service request to the next SCP in the path if there are additional SCPs in the path. The last SCP in the path send the producer 105 service request to the producer 105.

Figure 7:
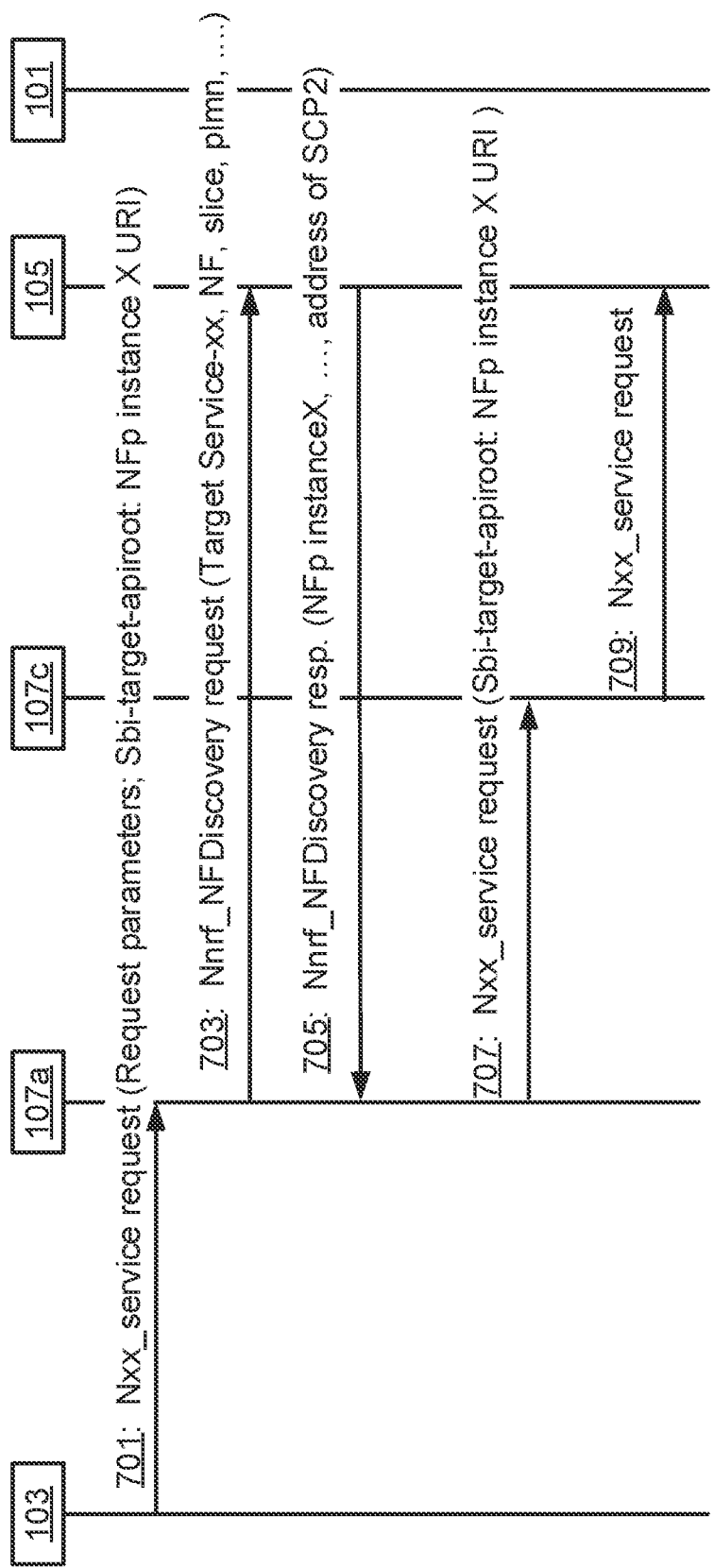
FIG. 7 is a signaling diagram illustrating indirect communication with routing path SCP discovery according to some embodiments of inventive concepts.

Turning to FIG. 7, a delegated discovery is depicted to receive a whole routing path. In block 701, the consumer 103 transmits a producer 105 service discovery request to an SCP in the consumer's region, which in FIG. 7 is SCP 107a. The discovery request may include a target service (e.g., producer 105), an NF identifier, a slice identifier, a plmn identifier, etc. In block 703, the SCP 107a transmits a producer 105 service discovery request to the NRF 101.

The service discovery request may include additional information based on the target service. Examples of the additional information are:
- If the target NF is UDM or AUSF, the request may include the UE's Routing Indicator.
- If the target NF is AMF, the request may include an AMF region, an AMF Set, GUAMI (Globally Unique AMF ID) and Target TAI (Tracing Area Identity).
- If the target NF is UDR or UDM or AUSF or PCF, the request may include UDR Group ID or UDM Group ID or AUSF Group ID or PCF Group ID respectively. It is assumed that the corresponding NF service consumer is either configured with the corresponding Group ID or it received it via earlier Discovery output. If the target NF is UDM, the request may include SUPI (Subscription Permanent Identifier), GPSI (Generic Public Description Identifier), Internal Group ID and External Group ID. If the target NF is UPF, the request may include SMF Area Identity, UE IPv4 Address/IPv6 Prefix, supported ATSSS (Access Traffic Steering, Switching & Splitting) steering functionality
- If the target NF is CHF, the request may include SUPI or GPSI as specified in TS 32.290.
- If the target NF is PCF or SMF, the request may include the MA PDU (Multiple Access Protocol Data Unit) Session capability to indicate that a NF instance supporting MA PDU session capability is requested.
- If the target NF is PCF, the request may include the DNN (Data Network Name) replacement capability to indicate that a NF instance supporting DNN replacement capability is preferred.

If the target NF is NWDAF, the request may include Analytics ID(s) and TAI(s). Details about NWDAF discovery and selection are described in clause 6.3.13, TS 23.501.

If the target NF is HSS, the request may include IMPI (IP Multimedia Private Identity), and/or IMPU (IMS Public User Identity) and/or HSS (Home Subscriber Service) Group ID.

If the NF service consumer needs to discover NF service producer instance(s) within an NF instance, the request includes the target NF Instance ID and NF Service Set ID of the producer.

If the NF service consumer needs to discover NF service producer instance(s) in an equivalent NF Service Set within an NF Set, the request includes the identification of the equivalent NF service Set and NF Set ID of producer. TS 29.510 specifies the mechanism to identify equivalent NF Service Sets.

If the NF service consumer needs to discover NF service producer instance(s) in the NF Set, the request includes the target NF Set ID of the producer.

If the target NF is SMF, the request may include the UE location (TAI).

If the target NF is P-CSCF, the request may include UE location information, UE IP address/IP prefix, Access Type.

If the target NF is NEF, the request may include Event ID(s) provided by AF, and optional AF identification as described in TS 23.288, clause 6.2.2.3. When the consumer is an AF, the request may include an External Identifier, External Group Identifier, or a domain name If the target NF is SMF, the request may include the Control Plane CIoT (Cellular Internet of Things) 5GS Optimisation Indication or User Plane CIoT 5GS Optimisation Indication.

The response to the discovery request is transmitted to the SCP 107a in block 705. The response includes the address of each SCP in the path from the SCP 107a to producer 105 (e.g., SCP 107c and SCP 107b (not shown)).

The response to the discovery request can include further information that relates to the target service. Examples of the further information include:

If the target NF is UDM, UDR, PCF or AUSF, they can include UDM Group ID, UDR Group ID, PCF Group ID, AUSF Group ID respectively.

If the target NF is HSS, it can include HSS Group ID.

For UDM and AUSF, a Routing Indicator can be included.

If the target NF is AMF, it includes list of GUAMI(s). In addition, it may include list of GUAMI(s) for which it can serve as backup for failure/maintenance.

If the target NF is CHF, it includes primary CHF instance and the secondary CHF instance pair(s).

For the UPF Management: UPF Provisioning Information as defined in clause 4.17.6.

S-NSSAI(s) and the associated NSI ID(s) (if available).

Information about the location of the target NF (operator specific information, e.g. geographical location, data center).

TAI(s).

PLMN (public land mobile network) ID.

If the target is PCF or SMF, it includes the MA PDU Session capability to indicate if the NF instance supports MA PDU session or not.

If the target is PCF, it includes the DNN replacement capability to indicate if the NF instance supports DNN replacement or not.

If the target NF is NWDAF, it includes the Analytics ID(s) and NWDAF Serving Area information. Details about NWDAF specific information are described in clause 6.3.13, TS 23.5011.

NF Set ID.

NF Service Set ID.

If the target NF is SMF, it may include the SMF(s) Service Area.

If no SMF Service Area is provided, the AMF assumes that a SMF can serve the whole PLMN.

If the target NF is P-CSCF, it includes P-CSCF FQDN(s) (Fully Qualified Domain Name(s)) or IP address(es) and optional Access Type(s) associated with each P-CSCF.

If the target NF is NEF, it may include Event ID(s) provided by AF.

Routing path: address of the SCP(s) in the routing path from consumer to producer. For each routing hop, one or multiple SCP addresses (for redundant SCPs). Optionally, for each hop in the routing path SCP priority for selection/re-selection (for load-balancing and failover situations).

The SCP 107a transmits a producer 105 service request to SCP 107c in block 707. The producer 105 service request may include concatenated SCP addresses of SCPs in the path from SCP 107a to producer 105 (e.g., SCP 107c and SCP 107b).

The SCP 107c receives the producer 105 service request and sends the producer 105 service request to the producer 105 in block 709 if there are no other SCPs in the path. If there are additional SCPs in the path, the SCP 107c sends the producer 105 service request to the next SCP in the path.

The SCPs that receive a service request have to identify that the request needs to reach a producer in its Region. There are a few ways that this identification may be done.

In a first way, 3GPP TS 29.501 v16.2.0, the usage of the 3gpp-Sbi-Target-apiRoot header for indirect communication via SCP, to allow the SCP to identify the real (service) target is described.

| 3gpp-Sbi-Target-apiRoot | Clause 5.2.3.2.4 | This header is used by an HTTP client to indicate the apiRoot of the target URI when communicating indirectly with the HTTP server via an SCP using HTTPS. |
|---|---|---|

A client may use the 3GPP-Sbi-Target-apiRoot in a different way in that each SCP that receives a request that includes this header should check whether this target is within the Region (each NF includes the Region it belong to, as commented above). If the target is not within the Region the SCP is within, the SCP should find next (Region) hop.

In a second way, each SCP in the middle of a path is only considered a transit SCP (without local NFs). A transit SCP should always find the next (Region) hop and then forward 3gpp-Sbi-Target-apiRoot header.

Either of the two ways may be applied. The address of SCP(s) may be included in the existing, but modified HTTP custom header sbi-target-apiroot as described above, or as an alternative a new custom header could be defined to convey the routing path.

The SCP in each hop is responsible to remove the next hop SCP URI from the custom header, and route to that URI. This is depicted in FIG. 8.

Figure 8:
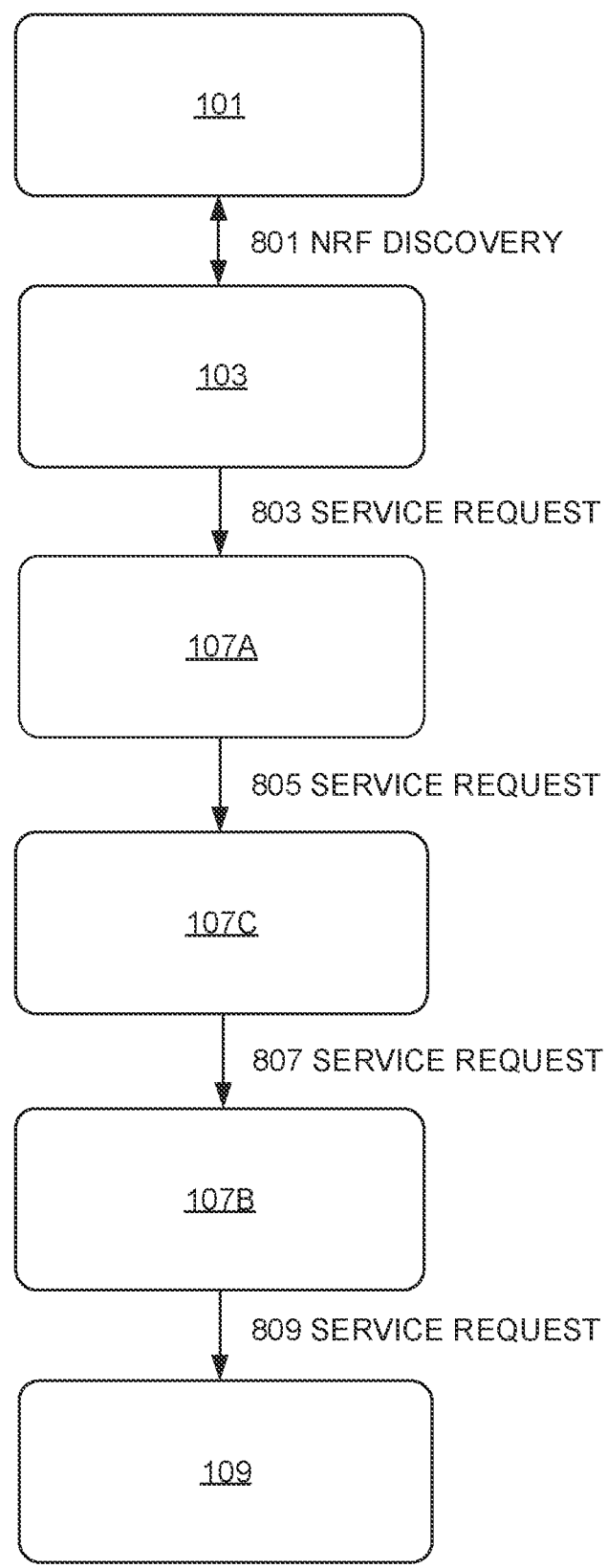
FIG. 8 is a flow chart illustrating operations of cascading uniform resource indicators according to some embodiments of inventive concepts.

Turning to FIG. 8, in NRF discovery block 801, the NRF 101 determines the request routing path as: cons→SCP1→SCP2→SCP3→Producer. The NRF 101 constructs the cascading URI: SCP1.op.com/SCP2.op.com/SCP3.op.com/Prod.op.com/xxx/svcA. The discovery result provided in the NF profile is generated:
    fqdn: SCP1.op.com
    apiPrefix:SCP2.op.com/SCP3.op.com/Prod.op.com/xxx/svcA In service request block 803, the consumer 103 generates a service request based on the cascading URI and constructs the next hop http2 headers:
    authority: SCP1.op.com
    path: SCP2.op.com/SCP3.op.com/Prod.op.com/xxx/svcA
The consumer 103 sends the service request to the first SCP (e.g., SCP 107a)

In service request block 805, the SCP 107a receives the service request from the consumer 103. The SCP 107a updates the cascading URI by removing the SCP 107a address: cascading URI: SCP2.op.com/SCP3.op.com/Prod.op.com/xxx/svcA. The SCP 107a constructs the next hop http2 headers:
    authority: SCP2.op.com
    3GPP-Sbi-Tarege-apiRoot: SCP3.op.com/Prod.op.com/xxx/svcA
The SCP 107a sends a service request to the next hop (e.g., SCP 107c).

In service block 807, the SCP 107c receives the service request from SCP 107a. The SCP 107a updates the cascading URI by removing the SCP 107c address: cascading URI: SCP3.op.com/Prod.op.com/xxx/svcA. The SCP 107c constructs the next hop http2 headers:
    authority: SCP3.op.com
    3GPP-Sbi-Tarege-apiRoot: Prod.op.com/xxx/svcA
The SCP 107c sends a service request to the next hop (e.g., SCP 107b).

In service block 809, the SCP 107b receives the service request from SCP 107c. The SCP 107b updates the cascading URI by removing the SCP 107b address: cascading URI: Prod.op.com/xxx/svcA. The SCP 107b constructs the next hop http2 headers:
    authority: Prod.op.com
    path: /xxx/svcA
The SCP 107b sends a service request to the producer 105.

The producer 105 receives the service request with the received http2 headers:
    authority: Prod.op.com
    path: /xxx/svcA The above figures describe the various embodiments in signaling diagrams. Each of the producers 105, 109 and consumers 103, 111 may be implemented as network nodes. The NRF 101 may be implemented as a network repository node and the service communication proxies 104a, 107b, 107c may be implemented as a separate node.

Figure 9:
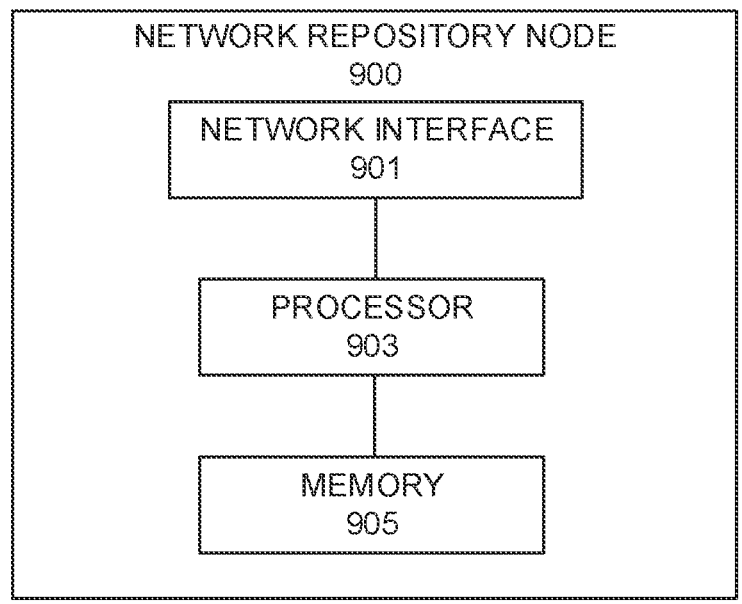
FIG. 9 is a block diagram of elements of a network repository node that are configured according to some embodiments of inventive concepts.

FIG. 9 is a block diagram illustrating elements of a network repository node 900 (also referred to as network node/terminal/device, etc.) configured to provide communication according to embodiments of inventive concepts. As shown, network repository node 900 may include a network interface 901 configured to provide communications with base station(s) of a network, SCPs, and other network nodes such as consumer nodes and producer nodes. Network repository node 900 may also include processing circuitry 903 coupled to the network interface circuitry 901, and memory circuitry 905 (also referred to as memory) coupled to the processing circuitry 903. The memory circuitry 905 may include computer readable program code that when executed by the processing circuitry 903 causes the processing circuitry to perform operations according to embodiments disclosed herein. According to other embodiments, processing circuitry 903 may be defined to include memory so that separate memory circuitry is not required. Network repository node 900 may also include an interface (such as a user interface) coupled with processing circuitry 903, and/or network repository node 900 may be incorporated in a vehicle.

As discussed herein, operations of network repository node 900 may be performed by processing circuitry 903. Moreover, modules may be stored in memory circuitry 905, and these modules may provide instructions so that when instructions of a module are executed by processing circuitry 903, processing circuitry 903 performs respective operations (e.g., operations discussed below with respect to Example Embodiments relating to network repository nodes).

Figure 10:
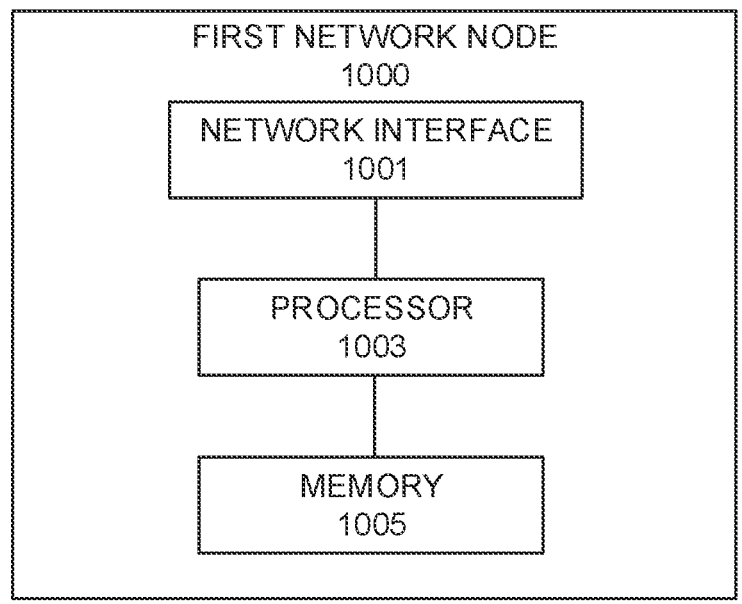
FIG. 10 is a block diagram of elements of a first network node that are configured according to some embodiments of inventive concepts.

FIG. 10 is a block diagram illustrating elements of a first network node 1000 (also referred to as a consumer network node, a producer network node, network node/terminal/device, etc.) configured to provide communication according to embodiments of inventive concepts. As shown, first network node 1000 may include a network interface 1001 configured to provide communications with base station(s) of a network, SCPs, and other network nodes such as consumer nodes and producer nodes. First network node 1000 may also include processing circuitry 1003 coupled to the network interface circuitry 1001, and memory circuitry 1005 (also referred to as memory) coupled to the processing circuitry 1003. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that separate memory circuitry is not required. First network node 1000 may also include an interface (such as a user interface) coupled with processing circuitry 1003, and/or first network node 1000 may be incorporated in a vehicle.

As discussed herein, operations of first network node 1000 may be performed by processing circuitry 1003. Moreover, modules may be stored in memory circuitry 1005, and these modules may provide instructions so that when instructions of a module are executed by processing circuitry 1003, processing circuitry 1003 performs respective operations (e.g., operations discussed below with respect to Example Embodiments relating to first network nodes).

Figure 11:
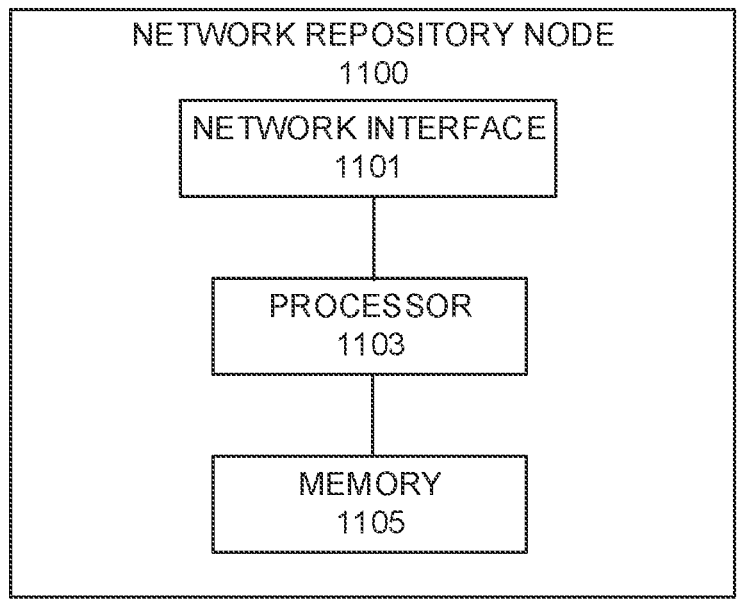
FIG. 11 is a block diagram of elements of a second network node that are configured according to some embodiments of inventive concepts.

FIG. 11 is a block diagram illustrating elements of a second network node 1100 (also referred to as network node/terminal/device, etc.) configured to provide communication according to embodiments of inventive concepts. As shown, second network node 1100 may include a network interface 1101 configured to provide communications with base station(s) of a network, SCPs, and other network nodes such as consumer nodes and producer nodes. Second network node 1100 may also include processing circuitry 1103 coupled to the network interface circuitry 1101, and memory circuitry 1105 (also referred to as memory) coupled to the processing circuitry 1103. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that separate memory circuitry is not required. Network repository node 1100 may also include an interface (such as a user interface) coupled with processing circuitry 1103, and/or network repository node 1100 may be incorporated in a vehicle.

As discussed herein, operations of a second network node 1100 may be performed by processing circuitry 1103. Moreover, modules may be stored in memory circuitry 1105, and these modules may provide instructions so that when instructions of a module are executed by processing circuitry 1103, processing circuitry 1103 performs respective operations (e.g., operations discussed below with respect to Example Embodiments relating to second network nodes).

Figure 12:
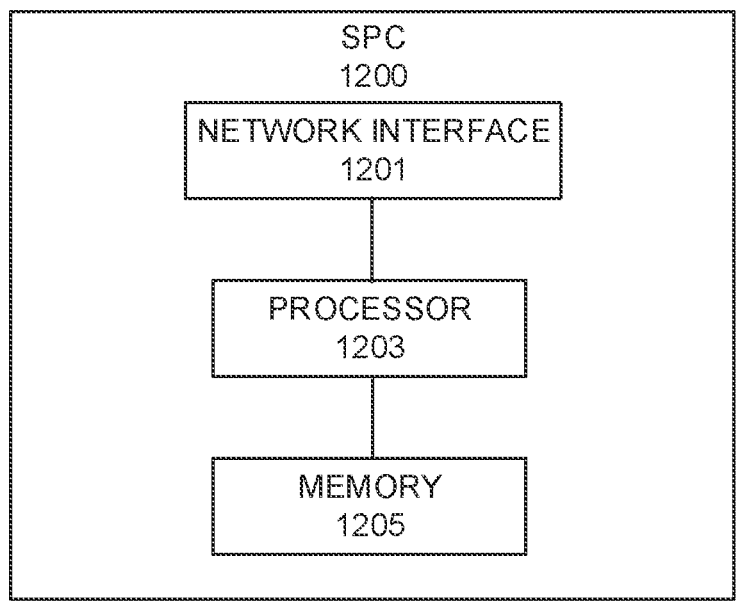
FIG. 12 is a block diagram of elements of a SCP that are configured according to some embodiments of inventive concepts.

FIG. 12 is a block diagram illustrating elements of a service communication proxy 1200 (also referred to as SPC node/terminal/device, etc.) configured to provide communication according to embodiments of inventive concepts. As shown, SCP node 1200 may include a network interface 1201 configured to provide communications with base station(s) of a network, other SCPs, and other network nodes such as consumer nodes and producer nodes. SCP 1200 may also include processing circuitry 1203 coupled to the network interface circuitry 1201, and memory circuitry 1205 (also referred to as memory) coupled to the processing circuitry 1203. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that separate memory circuitry is not required. SCP 1200 may also include an interface (such as a user interface) coupled with processing circuitry 1203, and/or SCP 1200 may be incorporated in a distributed network where functions of the SCP are distributed across network nodes.

As discussed herein, operations of SCP 1200 may be performed by processing circuitry 1203. Moreover, modules may be stored in memory circuitry 1205, and these modules may provide instructions so that when instructions of a module are executed by processing circuitry 1203, processing circuitry 1203 performs respective operations (e.g., operations discussed below with respect to Example Embodiments relating to SCPs).

Operations of a network function that may be implemented in the network repository node 900 (implemented using the structure of the block diagram of FIG. 9) or in the SCP 1300 (implemented using the structure of the block diagram of FIG. 13) or in another network node will now be discussed with reference to the flow chart of FIG. 13 according to some embodiments of inventive concepts. For example, modules may be stored in memory 905 of FIG. 9 or memory 1305 of FIG. 13, and these modules may provide instructions so that when the instructions of a module are executed by respective communication device processing circuitry 903 (or 1203), processing circuitry 903 (or 1203) performs respective operations of the flow chart.

Figure 13:
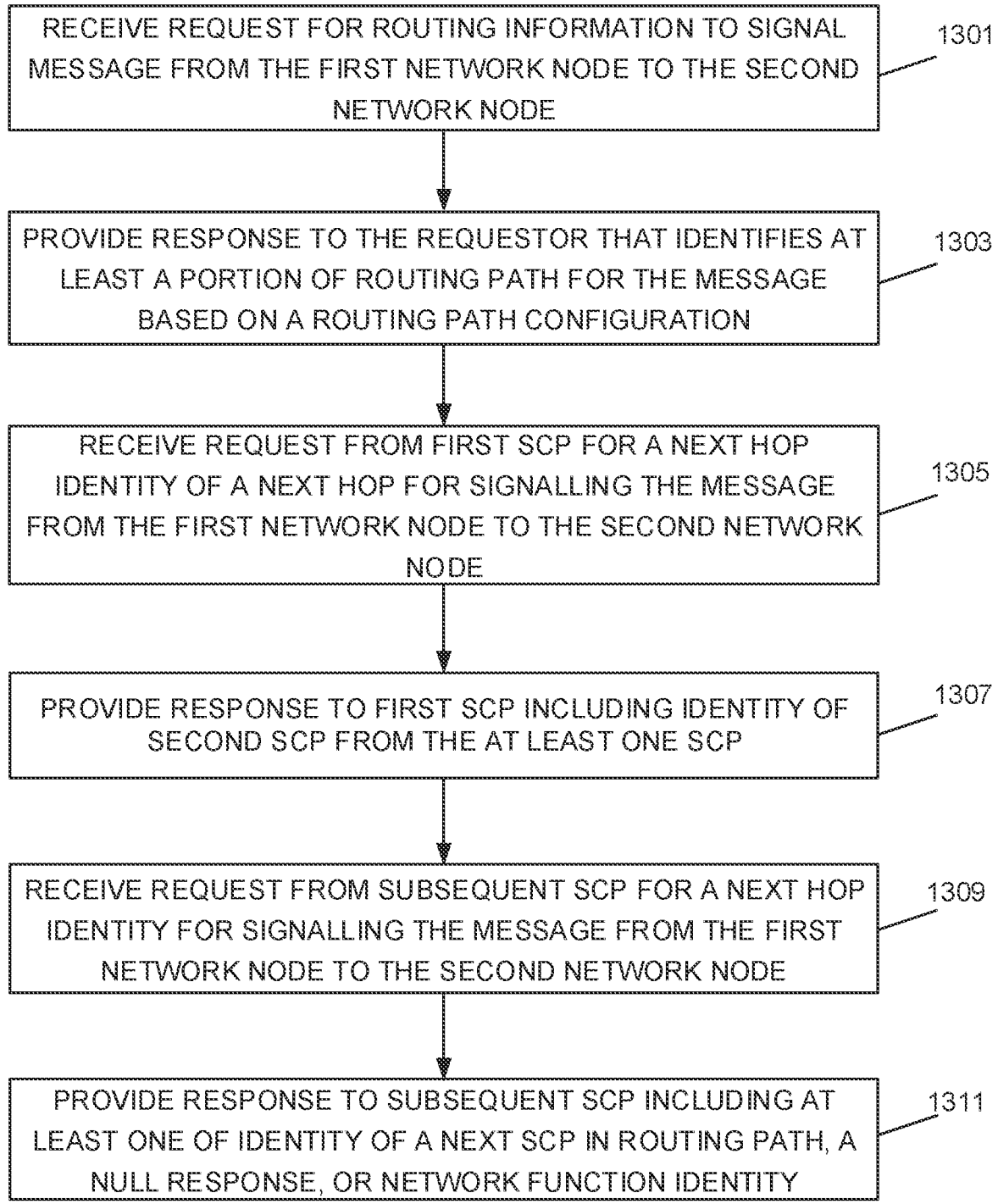
FIG. 13 is a flow chart illustrating operations of a network repository node according to some embodiments of inventive concepts.

In the description that follows, processing circuitry 903 shall be used to describe the flow chart of FIG. 13. Turning now to FIG. 13, in block 1301, processing circuitry 903 receives a request for routing information to signal a message from a first network node 1000 to a second network node 1100. The first network node may be a first SCP and the second network node may be a second SCP in some embodiments. In other embodiments, the first network node is one of a first SCP and a first network function in a network node in the second network node is one of a second SCP and a second function in a second network node. The request may be received from the first network node 1000 or from a SCP node 1300.

In block 1303, the processing circuitry, responsive to the request for routing information, provides a response to the network node that sent the request wherein the response identifies at least a portion of a routing path for the message based on a routing path configuration that identifies at least a portion of a routing path for the message based on a routing path configuration. In some embodiments, identifying the at least a portion of the routing path for the message based on the routing path configuration includes identifying at least a portion of a routing path for the message based on the routing path configuration, a profile of at least one of the at least one SCP, and a profile of the second network node.

The routing path configuration in some embodiments includes an identity of a plurality of regions in at least one routing path for the message between the first network node and the second network node. Each of the plurality of regions includes at least one SCP, and the identity of the plurality of regions in the at least one routing path are correlated to the identity of the at least one SCP included in each of the plurality of regions.

The profile of the at least one SCP includes information about the SCP in a region in which the SCP is deployed. The profile of the second network node includes a region in which the second network node is deployed. Additionally, in some embodiments, the portion of the routing path for the message may be further based on the profile of the first network node.

In various embodiments, the request is a request for a next Identity for signaling the message from the first network node to the second network node. The response to the first network node identifies at least a portion of a routing path that includes the identity of a first SCP from the at least one SCP.

In block 1305, the processing circuitry 903 receives a request from the first SCP for a next hop identity for signaling the message from a first network node to the second network node. Responsive to the request from the first SCP, the processing circuitry 903 provides a response to the first SCP including the identity of a second SCP from the at least one SCP.

In block 1309, the processing circuitry 903 receives a request from a subsequent SCP from the at least one SCP for a next hop identity for signaling the message from the first network node to the second network node. Responsive to the request from the subsequent SCP the processing node in block 1311 provides a response to the set subsequent SCP that includes at least one of the identity of a next SCP from the at least one SCP in the routing path or a null response or a network function identity.

In some embodiments, each of the next hop identity and the identity of the next SCP may be an address. In some embodiments, the routing path configuration and the profile of at least one of the last at least one SCP and the second network node are stored in a network repository node. In some of these embodiments, the routing path configuration is included in the profile of the at least one of the at least one SCP. The routing path configuration in some embodiments may be routing path defined by at least one of a per network node configuration or a per service granularity. The routing path configuration and the profile of the at least one of the at least one SCP and the second network node may be dynamically updated.

In yet other embodiments, the request is a request for discovering an identity of the routing path to signal the message from the first network node to the second network node. The response to the network node that sent the request identifies at least a portion of the routing path and includes the identity of the SCPs in the routing path from the first network node to the second network node. In some of these embodiments, the routing path includes a plurality of hops.

Each hop of the routing path includes an address for an SCP or an address for each SCP when redundant SCPs are included in a hop.

In other embodiments, the routing path includes a plurality of hops. Each have in the routing path includes an indication of priority for selection or reselection of each of the SCP's included in the routing path.

Various operations from the flow chart of FIG. 13 may be optional with respect to some embodiments of network nodes and related methods. Regarding methods of claim 1 (set forth below), for example, operations of blocks 1305 1307, 1309, and 1311 of FIG. 13 may be optional.

Figure 14:
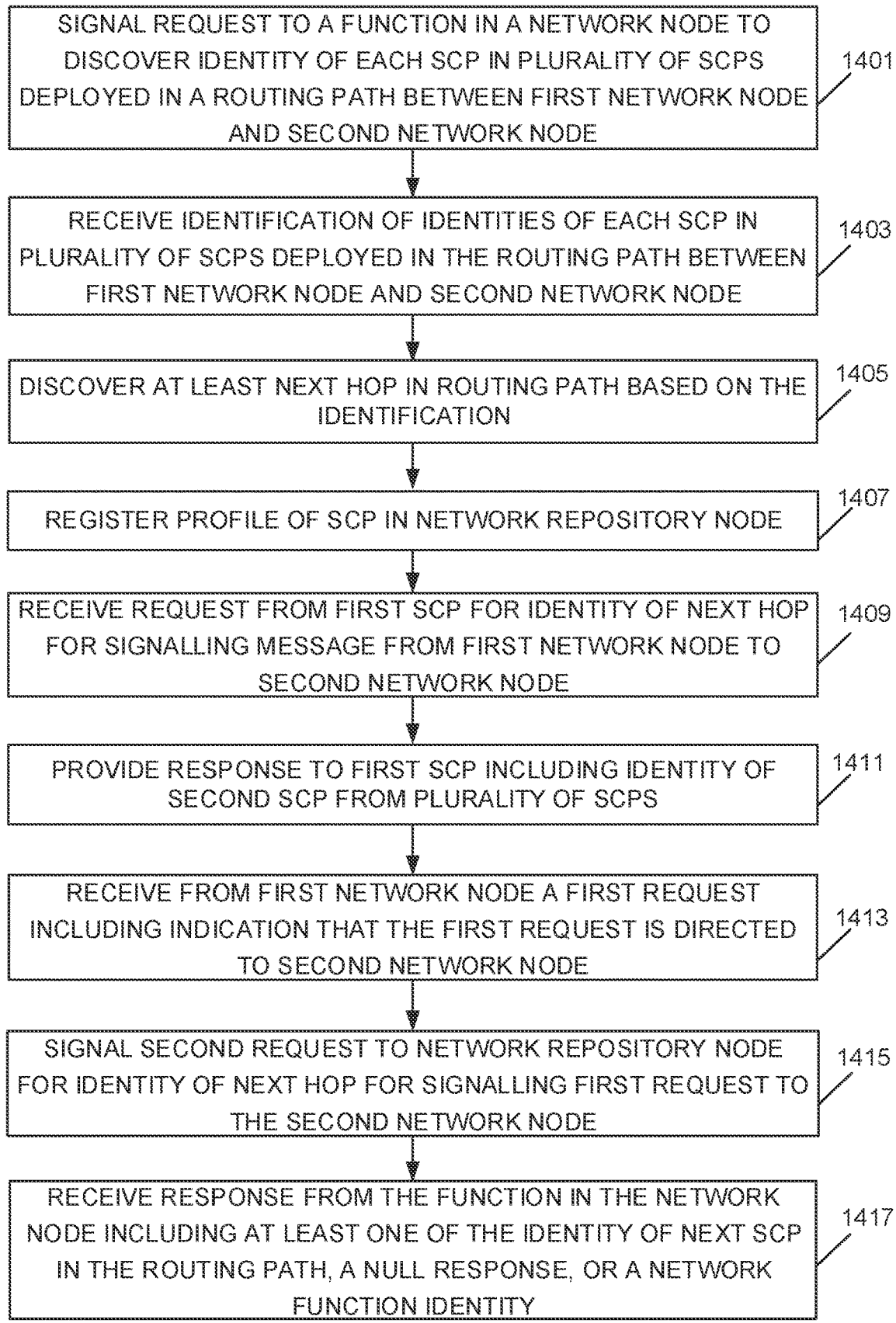
FIG. 14 is a flow chart illustrating operations of an SCP according to some embodiments of inventive concepts.

Turning now to FIG. 14, operations of a SCP 1200 (implemented using the structure of the block diagram of FIG. 12) will now be discussed with reference to the flow chart of FIG. 14 according to some embodiments of inventive concepts. For example, modules may be stored in memory 1205 of FIG. 12, and these modules may provide instructions so that when the instructions of a module are executed by respective SCP processing circuitry 1203, processing circuitry 1203 performs respective operations of the flow chart.

In block 1401, the processing circuitry 1203 signals a request to a function in a network node to discover an identity of each SCP in a plurality of SCPs deployed in a routing path between the first network node and the second network node. The identity may be an address.

In block 1403, responsive to the signal on, the processing circuitry receives an identification of the identities of each SCP in the plurality of SCP's deployed in the routing path between the first network node and the second network node. In some embodiments, the identification includes information about each SCP in the plurality of SCPs and a region in which each SCP is deployed. In other embodiments, the information about each SCP in the plurality of SCPs includes an availability of each SCP.

In block 1405, the processing circuitry 1203 discovers at least a next hop in the routing path based on the identification. In block 1407, the processing circuitry 1203 registers a profile of the SCP in a network repository node. The registering includes information about the SCP and a region in which the SCP is deployed.

In block 1409, the processing circuitry 1203 receives a request from a first SCP for an identity of a next hop for signaling a message from the first network node to the second network node. In block 1411, responsive to the request from the first SCP, the processing circuitry 1203 provides a response to the first SCP that includes the identity of a second SCP from the plurality of SCPs.

In block 1413, the processing circuitry 1203 receives from the first network node a first request that includes an indication that the first request is directed to the second network node. In block 1415, the processing circuitry signals a second request to a network repository node for an identity of a next hop for signaling the first request to the second network node.

In block 1417, responsive to signaling the second request, the processing circuitry 1203 receives a response from the network repository node that includes at least one of the identity of a next SCP from the plurality of SCPs in the routing path, a null response, or a network function identity.

In some embodiments, the processing circuitry 1203 receives from the first network node a first request comprising an indication that the first request is directed to the second network node where the first request further includes an identity of at least a next hop in the routing path for signaling the first request to the second network node. Responsive to receiving the first request, the processing circuitry signals the first request to the second network node. The indication in some embodiment includes a header in the first request indicating an identity of the second network node.

Various operations from the flow chart of FIG. 14 may be optional with respect to some embodiments of SCP nodes and related methods. Regarding methods of claim 29 (set forth below), for example, operations of blocks 1305 1307, 1309, and 1311 of FIG. 13 may be optional.

The invention claimed is:

1. A method performed by a function in a network node in a telecommunications network having a plurality of service communication proxies, SCPs, deployed between a first network node and a second network node, the method comprising:
   receiving, from a first SCP of the plurality of SCPs, a request for a next hop identity to signal a message from the first network node to the second network node; and
   responsive to the request from the first SCP, providing a response to the first SCP, wherein the response identifies at least a portion of a routing path for the message based on a routing path configuration, and the response includes the identity of a second SCP of the plurality of SCPs.

2. The method of claim 1 wherein the identifying the at least a portion of a routing path for the message based on a routing path configuration comprises identifying at least a portion of a routing path for the message based on a routing path configuration, a profile of at least one of the plurality of SCPs and, a profile of the second network node.

3. The method of claim 2, wherein the profile of a SCP comprises information about the SCP and a region in which the SCP is deployed.

4. The method of claim 2, wherein the profile of the second network node comprises a region in which the second network node is deployed.

5. The method of claim 2, wherein the routing path configuration and the profile of at least one of the at least one SCP and the second network node are stored in a network repository node.

6. The method of claim 2, wherein the routing path configuration is included in the profile of the at least one of the at least one SCP.

7. The method of claim 2, wherein the routing path configuration and the profile of at least one of the at least one SCP and the second network node are dynamically updated.

8. The method of claim 1, wherein the routing path configuration comprises an identity of a plurality of regions in at least one routing path for the message between the first network node and the second network node, wherein each of the plurality of regions comprises at least one SCP, and wherein the identity of the plurality of regions in the at least one routing path are correlated to an identity of the at least one SCP included in each of the plurality of regions.

9. The method of claim 1, further comprising:
   receiving a request from a subsequent SCP from the plurality of SCPs for a next hop identity for signalling the message from the first network node to the second network node; and
   responsive to the request from the subsequent SCP, providing a response to the subsequent SCP comprising at least one of an identity of a next SCP from the at least one SCP in the routing path or a null response or a network function identity.

10. The method of claim 9, wherein each of the next hop identity and the identity of the next SCP comprises an address.

11. The method of claim 1, wherein the routing path configuration comprises a routing path defined by at least one of a per network node configuration or a per service granularity.

12. The method of claim 1, wherein the request comprises a request for discovering an identity of the routing path to signal the message from the first network node to the second network node; and wherein the response to the first network node that identifies at least a portion of the routing path comprises an identity of the SCPs in the routing path from the first network node to the second network node.

13. The method of claim 12, wherein the routing path comprises a plurality of hops, and wherein for each hop the routing path comprises an address for an SCP or an address for each SCP when redundant SCPs are included in a hop.

14. The method of claim 12, wherein the routing path comprises a plurality of hops, and wherein for each hop in the routing path comprises an indication of priority for selection or re-selection of each of the SCPs included in the routing path.

15. A network node in a telecommunications network having a plurality of service communication proxies, SCPs, deployed between a first network node and a second network node, the network node comprising:
processing circuitry; and
memory coupled with the processing circuitry, wherein the memory includes instructions that when executed by the processing circuitry causes the communication device to perform operations comprising:
receiving, from a first SCP of the plurality of SCPs, a request for a next hop identity to signal a message from the first network node to the second network node; and
responsive to the request from the first SCP, providing a response to the first SCP, wherein the response identifies at least a portion of a routing path for the message based on a routing path configuration, and the response includes the identity of a second SCP of the plurality of SCPs.

16. A method performed by a service communication proxy, SCP, in a telecommunications network having a plurality of service communication proxies, SCPs, deployed between a first network node and a second network node, the method comprising:
signalling a request to a function in a network node to discover an identity of each SCP in the plurality of SCPs deployed in a routing path between the first network node and the second network node;
responsive to the signalling, receiving an identification of the identity of each SCP in the plurality of SCPs deployed in the routing path between the first network node and the second network node; and
discovering at least a next hop in the routing path based on the identification.

17. The method of claim 16, further comprising:
registering a profile of the SCP in a network repository node, wherein the registering includes information about the SCP and a region in which the SCP is deployed.

18. The method of claim 16, further comprising:
receiving a request from a first SCP for an identity of a next hop for signalling a message from the first network node to the second network node; and
responsive to the request from the first SCP, providing a response to the first SCP comprising the identity of a second SCP from the plurality of SCPs.

19. The method of claim 16, further comprising:
receiving from the first network node a first request comprising an indication that the first request is directed to the second network node;
signalling a second request to a network repository node for an identity of a next hop for signalling the first request to the second network node; and
responsive to signalling the second request, receiving a response from the function in the network node comprising at least one of the identity of a next SCP from the plurality of SCPs in the routing path, a null response, or a network function identity.

20. The method of claim 16, further comprising:
receiving from the first network node a first request comprising an indication that the first request is directed to the second network node, wherein the first request further comprises an identity of at least a next hop in the routing path for signalling the first request to the second network node; and
responsive to receiving from the first network node the first request, signalling the first request to the second network node.

21. A service communication proxy, SCP in a telecommunications network having at least one service communication proxy, SCP, deployed between a first network node and a second network node, the SCP node comprising:
processing circuitry; and
memory coupled with the processing circuitry, wherein the memory includes instructions that when executed by the processing circuitry causes the communication device to perform operations comprising:
signalling a request to a network repository node to discover an identity of each SCP in the plurality of SCPs deployed in a routing path between the first network node and the second network node;
responsive to the signalling, receiving an identification of the identity of each SCP in the plurality of SCPs deployed in the routing path between the first network node and the second network node; and
discovering at least a next hop in the routing path based on the identification.

* * * * *

UNITED STATES PATENT AND TRADEMARK OFFICE
CERTIFICATE OF CORRECTION

PATENT NO. : 11,876,703 B2
APPLICATION NO. : 17/798495
DATED : January 16, 2024
INVENTOR(S) : Bartolome Rodrigo et al.

It is certified that error appears in the above-identified patent and that said Letters Patent is hereby corrected as shown below:

On the Title Page

Item (72), under "Inventors", in Column 1, Line 2, delete "Torremocha de Jarama Madrid (ES);" and insert -- Torremocha de Jarama, Madrid (ES); --, therefor.

Item (57), under "ABSTRACT", in Column 2, Lines 7-8, delete "responsive to the request from the first network node, providing" and insert -- providing, in response to the request from the first network node, --, therefor.

In the Specification

In Column 1, Line 24, delete "network (5GC)," and insert -- (5GC) network, --, therefor.

In Column 1, Lines 54-55, delete "responsive to the request from the first network node, providing" and insert -- providing, in response to the request from the first network node, --, therefor.

In Column 2, Line 32, delete "is signaling" and insert -- is a signaling --, therefor.

In Column 4, Line 8, delete "based in" and insert -- based on --, therefor.

In Column 5, Line 38, delete "what" and insert -- which --, therefor.

In Column 8, Line 5, delete "response" and insert -- response. --, therefor.

In Column 8, Line 9, delete "may in" and insert -- may --, therefor.

In Column 8, Line 20, delete "107b)" and insert -- 107b). --, therefor.

In Column 8, Line 50, delete "it received" and insert -- received --, therefor.

Signed and Sealed this
Sixteenth Day of July, 2024

*Katherine Kelly Vidal*

Katherine Kelly Vidal
*Director of the United States Patent and Trademark Office*

CERTIFICATE OF CORRECTION (continued)
U.S. Pat. No. 11,876,703 B2

In Column 8, Line 53, delete "Description" and insert -- Subscription --, therefor.

In Column 8, Line 57, delete "functionality" and insert -- functionality. --, therefor.

In Column 9, Line 32, delete "name" and insert -- name. --, therefor.

In Column 10, Line 4, delete "23.5011." and insert -- 23.501. --, therefor.

In Column 10, Line 42, delete "an HTTP" and insert -- a HTTP --, therefor.

In Column 11, Line 13, delete "107a)" and insert -- 107a). --, therefor.

In Column 15, Line 5, delete "Each have" and insert -- Each hop --, therefor.

In Column 15, Line 28, delete "signal on." and insert -- signal, --, therefor.

In the Claims

In Column 16, Line 28, in Claim 2, delete "claim 1" and insert -- claim 1, --, therefor.

In Column 17, Line 21, in Claim 14, delete "hop in" and insert -- hop --, therefor.